United States Patent [19]

Sandstrom et al.

[11] Patent Number: 5,284,195
[45] Date of Patent: Feb. 8, 1994

[54] TIRE WITH TREAD BASE RUBBER BLEND

[75] Inventors: Paul H. Sandstrom, Tallmadge; William P. Francik, Bath; David M. Smith, Akron, all of Ohio

[73] Assignee: The Goodyear Tire & Rubber Company, Akron, Ohio

[21] Appl. No.: 850,650

[22] Filed: Mar. 13, 1992

[51] Int. Cl.$^5$ .................................. B60C 11/00
[52] U.S. Cl. ........................................ 152/209 R
[58] Field of Search ............... 152/209 R, 532; 525/236, 237; 156/123, 127, 128.1, 128.6, 129; 264/501, 502

[56] References Cited

U.S. PATENT DOCUMENTS

| | | | |
|---|---|---|---|
| 3,337,520 | 8/1967 | Bjornson et al. | 525/237 |
| 3,830,275 | 8/1974 | Russell | 152/209 R |
| 4,510,291 | 4/1985 | Kawakami . | |
| 4,603,721 | 8/1986 | Kogure et al. | 152/209 R |
| 5,017,636 | 5/1991 | Hattori et al. . | |

FOREIGN PATENT DOCUMENTS

| | | | |
|---|---|---|---|
| 870053 | 5/1971 | Canada | 152/209 R |
| 60-133036 | 7/1985 | Japan . | |
| 61-143453 | 7/1986 | Japan . | |
| 62-101504 | 5/1987 | Japan . | |

*Primary Examiner*—Geoffrey L. Knable
*Attorney, Agent, or Firm*—Henry C. Young, Jr.

[57] ABSTRACT

A tire having a tread of a cap/base construction where the base rubber compound is comprised of trans 1,4-polyisoprene and at least one additional diene rubber.

4 Claims, No Drawings

TIRE WITH TREAD BASE RUBBER BLEND

FIELD

This invention relates to a pneumatic rubber tire having a rubber tread of a cap/base construction. More specifically, the invention relates to such a tire having a tread base of an elastomeric composition.

BACKGROUND

Pneumatic rubber tires are often prepared with a rubber tread having a cap/base construction. Such constructions are well known. It may be referred to herein as a composite of such two components.

Typically, the outer cap portion of the tread contains the visible tread grooves and lugs, or raised portions, which is designed to contact the ground. The cap portion usually includes such tread configuration and usually extends to a tread depth of just below the grooves of the tread. The rubber for the cap portion is typically compounded to provide good skid resistance, treadwear and rolling resistance.

The rubber base portion of the tread is positioned beneath the cap portion and, being a part of the tread itself, is located between the outer tread cap and an underlying supporting belt or carcass portion of the tire. Such tire construction is well known. The rubber for the base is typically compounded to enhance rolling resistance and durability for the tire. The terms "rubber composition" and "rubber compound" may be used somewhat interchangeable in this description.

Often, a primary purpose for dividing a tread into an outer cap portion and an inner, underlying base portion is to provide a tread base which will reduce the tire's rolling resistance. Otherwise a single composition tread construction might be satisfactory so that the tread is composed of the tread cap throughout.

In one aspect, the cap/base rubber composite may be designed to improve the rolling resistance of the tire without unduly sacrificing its traction (skid resistance) or treadwear. Such often desirable aspect is usually difficult to obtain with a single tread compound because, for example, rolling resistance reduction is typically obtained at the expense of traction and/or treadwear.

In another aspect, it would seem that increasing the thickness (gauge) of the base rubber compound, while maintaining the same overall thickness of the tread, would provide an additional improvement in tire rolling resistance (lower resistance to the rolling of the tire, usually under loaded conditions).

However, it has been observed that increasing the thickness of the base tread rubber can result, during the molding and curing of the tire, in extreme base peaking of the base rubber into the lugs of the cap rubber itself. Thus, elements of the base are caused to extend substantially outward into the cap portion of the tire. This is disadvantageous both because groove cracking in the tread cap may develop and also primarily as the lugs of the cap wear away as the tire is used, the exposed base compound becoming in contact with the road would result in poor traction and treadwear.

A difficulty of such base peaking may become evident as the tire tread wears during use so that the tread cap becomes thinner and the base peaks eventually become exposed and contact the road surface. The resulting exposed tread surface may then not present optimum tread properties to the road surface.

The phenomenon of the base peaking into the lug portion of the cap is largely attributed to the uncured base rubber viscosity often being lower than the viscosity of the cap rubber. Thus, during the molding and curing of the tire under conditions of heat and pressure, the base rubber may have a greater tendency to flow than the cap rubber and, therefore, allow a displacement of the base rubber as the cap rubber is formed into lugs and grooves.

It is, therefore, desirable to increase the viscosity of the uncured base rubber compound while maintaining a satisfactory resilience (rebound value) of the cured base rubber compound.

In one aspect, the viscosity of the uncured base rubber may be readily increased with conventional compounding ingredients, such as, for example, increasing its carbon black content and, optionally, reducing its oil content. However, it is considered that such technique tends to defeat the overall concept of a tread base because it tends to increase hysteresis of the rubber compound which typically results in poorer rolling resistance of the tire.

The use of trans 1,4-polybutadiene has been disclosed for various purposes, including, for example, tire tread rubber compounds and increasing green strength of rubber mixtures (See Japanese Patent Publication Nos. 60-133,036; 62-101,504 and 61-143,453) and U.S. Pat. No. 4,510,291.

Trans 1,4-polybutadiene has been previously considered for use in a tread base rubber composition. However, it is further considered that the use of trans 1,4-polyisoprene is a departure therefrom.

Use of trans 1,4-polybutadiene in a tread base composition was considered to be an improvement because it reduced the peaking of the base rubber into the outer cap rubber of the tire tread during the tire curing operation. A particular advantage of the trans 1,4-polybutadiene was its relatively high softening point (e.g. 50° C.), so that it would not begin to flow as rapidly as other tread rubbers as the temperature of the tire would increase in the tire mold. However, uniquely, the trans 1,4-polybutadiene exhibited a second, and primary, softening point (e.g. 25° C.) which was substantially lower than its higher, minor softening point.

Uniquely, the trans 1,4-polyisoprene has only one softening point (e.g. 60° C.) and, thus, might possibly provide an even greater advantage of use in a tread base rubber composition. It might tend to flow even less than the trans 1,4-polybutadiene and, thus, advantageously even further reduce base tread rubber peaking into the tread cap rubber during curing because it does not have the second, lower, primary softening point (e.g. 25° C.) so that it might not be expected to substantially flow in the mold at or near such lower temperature.

Uniquely, trans 1,4-polyisoprene is typically a thermoplastic resin rather than most other rubbers in its uncured state at room temperature by virtue of its high crystallinity. Because it contains many double bonds in its backbone, it can, however, be suitably blended and co-cured with elastomers to yield a cured rubber composition.

DISCLOSURE AND PRACTICE OF THE INVENTION

In accordance with this invention, a rubber tire is provided having a rubber tread of a cap/base construction where said base is a sulfur cured rubber composition comprised of, based on 100 parts by weight rubber (phr), (A) about 50 to about 95, preferably about 65 to about 90 parts by weight of at least one diene rubber selected from natural and/or synthetic cis 1,4-polyisoprene rubber, cis 1,4-polybutadiene rubber, styrene/butadiene copolymer rubber, styrene/isoprene/ butadiene terpolymer rubber and 3,4-polyisoprene rubber; and (B) about 5 to about 50, preferably about 10 to about 35 parts by weight of a trans 1,4-polyisoprene characterized by having at least about a 90 percent trans 1,4-content.

Preferably, such trans 1,4-polyisoprene is characterized by having at least 90, preferably at least 95 percent of its isoprene repeat units of a trans 1,4-isomeric structure and, in its uncured state, a melting point in the range of about 50° C. to about 70° C.

For the purposes of this description, the "compounded" rubber compositions refer to the respective rubber compositions which have been compounded with appropriate compounding ingredients such as, for example, carbon black, oil, stearic acid, zinc oxide, silica, wax, antidegradants, resin(s), sulfur and accelerator(s).

The addition of the aforesaid trans 1,4-polyisoprene resin to the tread base rubber composition has been observed to enable the use of up to about 60 percent increase in gauge (thickness) of a tread base, while reducing the gauge of the tread cap by a corresponding amount and, thus, retaining the overall thickness of the cap/base construction, without appreciably increasing base peaking in the tread cap/base combination. This would be anticipated to reduce the hysteresis of the cap/base composite and result in improving rolling resistance.

Such phenomenon uniquely suggests the preparation of an improved tire tread by enabling the use of a tread cap with good high traction and/or treadwear properties with a thicker tread base without appreciably sacrificing rolling resistance.

Thus, a further aspect of this invention is directed to a method of preparing a pneumatic rubber tire with a tread of cap/base construction which comprises shaping and curing an uncured pneumatic rubber tire in a mold by pressing said tire outwardly against a mold surface under conditions of heat and pressure to cause at least the tread rubber of said tire to flow and cure against said mold surface, the improvement which comprises providing, for said tread base, the base rubber of this invention. This, in combination with the use of the trans 1,4-polyisoprene is important to retard the flow, or peaking, of the base rubber into the cap rubber during the tire cure operation.

The relatively low melting point of the required trans 1,4-polyisoprene is particularly an advantage because it does not present an appreciable processing difficulty because it is substantially below typical tread rubber processing temperatures, whereas, other potential methods which might be considered for reducing base peaking involve using larger amounts of filler or higher softening point resins would present processing difficulties.

In the practice of this invention, the tread cap rubber composition may be comprised of at least one rubber selected, for example, from cis 1,4-polyisoprene rubber (natural and/or synthetic), 3,4-polyisoprene rubber, styrene/butadiene copolymer rubbers, styrene/isoprene/ butadiene terpolymer rubbers, and cis 1,4-polybutadiene rubber. Preferably it may be comprised of a combination of two or more of cis 1,4-polyisoprene rubber (natural or synthetic) 3,4-polyisoprene rubber, styrene/isoprene/butadiene rubber, emulsion and solution polymerization derived styrene/butadiene rubbers and cis 1,4-polybutadiene rubbers.

It is readily understood by those having skill in the art that the rubber compositions of the cap and base rubbers would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical additions of carbon black comprise about 20 to 100 parts by weight carbon black per 100 parts by weight of diene rubber (often abbreviated as phr), preferably 30 to 60 phr. Typical amounts of tackifier resins, if used, comprise about 0.5 to about 10 phr, usually about 1 to about 5 phr. Typical amounts of processing aids comprise 1 to 20 phr. Such processing aids can include, for example, aromatic, napthenic, and/or paraffinic processing oils. Silica, ifuused, may be used in an amount of about 5 to about 25 phr, often with or without a silica coupling agent. Representative silicas may be, for example, hydrated amorphous silicas. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344-346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention which is more primarily directed to the utilization of specified blends of rubbers in tire treads, particularly as to the inclusion of the trans 1,4-polyisoprene in the tread base, as sulfur vulcanizable compositions.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 2.0, preferably about 0.8 to about 1.2, phr. In another embodiment, combinations of a primary or and a secondary accelerator might be used with the secondary accelerator being used in smaller amounts (0.05-0.50 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the utilization of specified blends of rubbers in tire treads, particularly the inclusion of the trans 1,4-polyisoprene in the tread base.

The tire can be built, shaped, molded and cured by various methods which will be readily apparent to those having skill in such art.

The prepared tire of this invention is conventionally shaped and cured by methods known to those having skill in such art.

The invention may be better understood by reference to the following example in which the parts and percentages are by weight unless otherwise indicated.

EXAMPLE I

Mixtures of diene rubbers and trans 1,4-polyisoprene having a softening point of about 58° C. were prepared comprised of the following recipe shown in Table 1 as Experiments A and B. Experiment B is considered a control.

TABLE 1

| | Parts | |
|---|---|---|
| Material | Exp. A | Exp. B (Control) |
| Natural Rubber | 75 | 75 |
| Synthetic Cis 1,4-Polyisoprene | 0 | 25 |
| Trans 1,4-Polyisoprene[1] | 25 | 0 |
| Carbon Black | 35 | 35 |
| Processing Oil (paraffinic) | 2 | 2 |
| Accelerator(s) | 1.1 | 0.9 |

Conventional, preferred, amounts of antidegradant(s) (para-phenylene diamine type), tackifying resin, fatty acid, zinc oxide, peptizer, sulfur and primary accelerator(s) of the sulfenamide type were used, with two accelerators for Exp. A and one accelerator for Exp. B.

1. A synthetic trans 1,4-polyisoprene characterized by reported high trans 1,4-polyisoprene content (99 percent trans 1,4-) obtained as TP-301 from the Kuraray Company, Ltd.

The trans 1,4-polyisoprene for this example characterized by having a trans 1,4-content of about 99 percent by infrared analysis. It was found to have a number average molecular weight of about 36,500 and a weight average molecular weight of about 450,000 according to gel permeation chromatographic analysis. Its Tg was about −69° C. and melting point (Tm) of about 59° C. by differential scanning calorimetric analysis at 10° C. per minute (DuPont 9900 instrument). While the term "melting point" is considered to more accurately refer to the Tm, in some cases in this specification it is referred to as a softening point.

EXAMPLE II

The prepared rubber compositions were cured at a temperature of about 150° C. for about 20 minutes and the resulting cured rubber samples evaluated for their physical properties as shown in the following Table 2. The experimental samples A and B correspond to the experimental samples A and B of Example I.

TABLE 2

| Properties | Exp. A | Exp. B (Control) |
|---|---|---|
| 300% Modulus (MPa) | 7.5 | 7.7 |
| Rebound[1] (%) | 69 | 70 |
| Tear (Strebler Peel)[2] (N) | 31 | 67 |
| Shore A Hardness (23° C.) | 50 | 49 |

1. The rebound value is determined by pendulum rebound test, a type of method well known to those having skill in rubber property determination. It is a cured rubber property.
2. Adhesion to itself. It is a cured property. Thus, the indicated cured properties; rebound, modulus are similar and hardness, thus, making the trans 1,4-polyisoprene a good candidate for tread base application.

EXAMPLE III

Pneumatic rubber tires were prepared of size P195/75R14, steel belted radial ply tires, which had rubber treads of a cap/base construction. Two tires had their base rubber composed of the rubber composition shown as Experiment A of Examples I and II, and two tires had their base rubber composed of the control Experiment B of Examples I and II.

The tires are correspondingly identified herein as Tires B-1 and B-2 and Tires A-1 and A-2, respectively. Tires B-1 and A-1 had tread bases of green thicknesses of 0.05 inches and tires B-2 and A-2 had tread bases of green (uncured) thicknesses of 0.08 inches.

Cross-sections of the cured tires were obtained and their tread cap/base interfaces visually inspected.

A significant reduction of base peaking into the tread cap was observed for tires with treads having a base composition of said Experiment A as compared to the tire treads with a base composition of Control Experiment B.

These tires demonstrate that the inclusion of the trans 1,4-polyisoprene in the tread has a very definite effect in reducing base peaking into the tread cap.

Indeed, the visible effect is more dramatic with Tire B-2 (Control) and Tire A-2 (using the trans 1,4-polyisoprene in the tread base). These tires had the thicker tread base and, thus, would normally be expected to exhibit a greater degree of base peaking into the tread cap. For the Control Tire B-2, there was the considerable and expected base peaking. For the Experimental Tire A-2, there was little or no base peaking.

Therefore, it is observed that a particular advantage of this invention, where a tire tread composed of an outer cap portion and an inner, underlying, base portion is the utilization of trans 1,4-polyisoprene rubber in the tread base rubber composition to retard base peaking into the tread cap during the tire molding and curing operation.

This aspect can be of particular advantage where a thicker tread base is desired in a tread cap/base construction where the base is more resilient and typically less tractive and less wearing than the cap and is intended to have a property of reducing the rolling resistance of the tire itself, rather than to be relied upon to provide the traction and wear of the tread cap.

Thus, in the practice of this invention, the trans 1,4-polyisoprene polymer is considered as acting as a reinforcing plastic filler before vulcanization and acting to restrict flow of the tread base rubber into the cap rubber during the molding of the tire, however, during curing the trans 1,4-polyisoprene plastic melts and blends into the polymer matrix, transforms into a rubbery polymer upon curing resulting in a highly resilient cured polymer blend.

While certain representative embodiments and details have been shown for the purpose of illustrating the invention, it will be apparent to those skilled in this art that various changes and modifications may be made therein without departing from the spirit or scope of the invention.

What is claimed is:

1. A rubber tire having a rubber tread of a cap/base construction where said base rubber composition is comprised of, based on 100 parts by weight rubber, (A) about 50 to about 95 parts by weight of at least one diene rubber selected from natural and/or synthetic cis 1,4-polyisoprene rubber, cis 1,4-polybutadiene rubber, styrene/butadiene copolymer rubber, styrene/isoprene/butadiene terpolymer rubber and 3,4-polyisoprene rubber; and (B) about 5 to about 50 parts by weight of a trans 1,4-polyisoprene rubber characterized by having at least about a 90 percent trans 1,4-content; wherein the tire cap rubber is at least one rubber selected from natural and/or synthetic cis 1,4-polyisoprene rubber, 3,4-polyisoprene rubber, styrene/butadiene copolymer rubbers, styrene/isoprene/butadiene terpolymer rubbers, and cis 1,4-polybutadiene rubber.

2. The tire of claim 1 where said base rubber composition is comprised of, based on 100 parts by weight rubber, (A) about 65 to about 90 parts by weight of at least one of said diene rubbers, and (B) about 10 to about 35 parts by weight of said trans 1,4-polyisoprene rubber.

3. A rubber tire having a rubber tread of a cap/base construction where said base rubber composition is comprised of, based on 100 parts by weight rubber, (A) about 50 to about 95 parts by weight of at least on diene rubber selected from natural and/or synthetic cis 1,4-polyisoprene rubber, cis 1,4-polybutadiene rubber, styrene/butadiene copolymer rubber, styrene/isoprene/butadiene terpolymer rubber and 3,4-polyisoprene rubber; and (B) about 5 to about 50 parts by weight of a trans 1,4-polyisoprene rubber characterized by having about a 95 to about a 100 percent trans 1,4-content; the tread cap rubber is a combination of at least two rubbers selected from natural and/or synthetic cis 1,4-polyisoprene rubber, 3,4-polyisoprene rubber, styrene/isoprene/butadiene rubber, emulsion and solution polymerization derived styrene/butadiene rubbers and cis 1,4-polybutadiene rubber.

4. The tire of claim 3 where said base rubber composition is comprised of, based on 100 parts by weight rubber, (A) about 65 to about 90 parts by weight of at least one of said diene rubbers, and (B) about 10 to about 35 parts by weight of said trans 1,4-polyisoprene rubber.

* * * * *